(12) United States Patent
Fu

(10) Patent No.: US 12,283,893 B2
(45) Date of Patent: Apr. 22, 2025

(54) CONVERTER CIRCUIT WITH HALF-BRIDGE CURRENT-DOUBLER RECTIFIER AND INTEGRATED MAGNETICS

(71) Applicant: Monolithic Power Systems, Inc., San Jose, CA (US)

(72) Inventor: Dianbo Fu, San Jose, CA (US)

(73) Assignee: Monolithic Power Systems, Inc., San Jose, CA (US)

(*) Notice: Subject to any disclaimer, the term of this patent is extended or adjusted under 35 U.S.C. 154(b) by 345 days.

(21) Appl. No.: 18/085,161

(22) Filed: Dec. 20, 2022

(65) Prior Publication Data
US 2024/0204676 A1    Jun. 20, 2024

(51) Int. Cl.
   *H02M 3/335*    (2006.01)
(52) U.S. Cl.
   CPC ............................. *H02M 3/33576* (2013.01)
(58) Field of Classification Search
   CPC ......... H02M 3/33576; H02M 3/33573; H02M 1/088
   See application file for complete search history.

(56) References Cited

U.S. PATENT DOCUMENTS

| | | | |
|---|---|---|---|
| 9,774,271 B2 | 9/2017 | Dai et al. | |
| 10,199,950 B1 | 2/2019 | Vinciarelli et al. | |
| 10,211,745 B2 | 2/2019 | Murakami et al. | |
| 10,284,099 B2 | 5/2019 | Zhang et al. | |
| 11,855,530 B1* | 12/2023 | Feng | H02M 3/33576 |
| 2005/0041439 A1* | 2/2005 | Jang | H02M 3/33573 363/17 |
| 2021/0082615 A1 | 3/2021 | Jin et al. | |
| 2021/0408924 A1* | 12/2021 | Jin | H02M 3/01 |
| 2023/0061145 A1* | 3/2023 | Fu | H02M 3/33576 |

OTHER PUBLICATIONS

Balogh, Laszlo, "The Current-Doubler Rectifier: An Alternative Rectification Technique for Push-Pull and Bridge Converters", Unitrode, DN-63, Texas Instruments Incorporated, 1999.
Huang, Daocheng et al. "Novel Non-isolated LLC Resonant Converters", 2012 Twenty-Seventh Annual IEEE Applied Power Electronics Conference and Exposition (APEC), Orlando, FL, USA, 2012, pp. 1373-1380, doi: 10.1109/APEC.2012.6165999.

* cited by examiner

*Primary Examiner* — Kyle J Moody
(74) *Attorney, Agent, or Firm* — Beyer Law Group LLP

(57) ABSTRACT

A novel converter circuit topology is disclosed. The converter circuit has a bridge circuit, a transformer, and a half-bridge current-doubler rectifier. An input end of the bridge circuit is connected to an input voltage node of the converter circuit. A reference end of the bridge circuit is connected to an output voltage node of the converter circuit. Opposing ends of a primary winding of the transformer are connected to bridge nodes of the bridge circuit. A secondary winding of the transformer serves as current-doubler inductors of the half-bridge current-doubler rectifier. A tap of the secondary winding is connected to the reference end of the bridge circuit.

11 Claims, 3 Drawing Sheets

CONVERTER CIRCUIT WITH HALF-BRIDGE CURRENT-DOUBLER RECTIFIER AND INTEGRATED MAGNETICS

TECHNICAL FIELD

The present disclosure is generally directed to converter circuits.

BACKGROUND

A converter is an electrical circuit that receives an input voltage to generate a regulated output voltage. The output voltage is lower than the input voltage in the case of a buck converter, whereas the output voltage is higher than the input voltage in the case of a boost converter. A converter may employ a transformer to scale or isolate a voltage presented on the primary winding of the transformer. In high-current, low voltage applications, the secondary winding of the transformer may not have enough turns to meet the output current requirement of the application. In that application, a current-doubler, which includes a pair of discrete inductors, may be employed to increase the current on the secondary side.

Converters are employed in a variety of devices, including computers, smart phones, etc. With the push for more energy efficient and smaller devices, there is a need for converters that have high efficiency and low cost, and allow for high printed circuit board (PCB) density.

BRIEF SUMMARY

In one embodiment, a converter circuit comprises a bridge circuit, a transformer, and a half-bridge current-doubler rectifier. The bridge circuit is connected between an input voltage node and an output voltage node of the converter circuit. The bridge circuit has a first bridge node, a second bridge node, an input end that is connected to the input voltage node, and a reference end that is connected to the output voltage node. The transformer comprises a primary winding and a secondary winding, the secondary winding having a first portion and a second portion, the primary winding having a first end that is connected to the first bridge node and a second end that is connected to the second bridge node, the first and second ends of the primary winding being opposing ends of the primary winding. The half-bridge current-doubler rectifier comprises the first portion of the secondary winding as a first inductor and the second portion of the secondary winding as a second inductor, a tap between the first and second portions of the secondary winding being connected to the reference end of the bridge circuit.

In another embodiment, a converter circuit receives an input voltage at an input voltage node and generates an output voltage at an output voltage node. The converter circuit comprises a transformer, a bridge circuit, and a half-bridge current-doubler rectifier. The transformer comprises a primary winding and a secondary winding, the secondary winding comprising a first portion and a second portion, a center tap of the secondary winding being between the first and second portions of the secondary winding. The bridge circuit has an input end that is connected to the input voltage node, a reference end that is connected to the output voltage node, a first bridge node that is connected to a first end of the primary winding, and a second bridge node that is connected to a second end of the primary winding, the first and second ends of the primary winding being opposing ends of the primary winding. The half-bridge current-doubler rectifier comprises the secondary winding, the center tap of the secondary winding being connected to the reference end of the bridge circuit.

In yet another embodiment, a converter circuit comprises: a transformer comprising a primary winding and a secondary winding, the secondary winding comprising a first portion and a second portion, a center tap of the secondary winding being between the first and second portions of the secondary winding, the center tap of the secondary winding being connected to an output voltage node of the converter circuit; a first switch comprising a first terminal that is connected to an input voltage node of the converter circuit and a second terminal that is connected to a first bridge node, the first bridge node being connected to a first end of the primary winding; a second switch comprising a first terminal that is connected to the first bridge node and a second terminal that is connected to the center tap of the secondary winding; a third switch comprising a first terminal that is connected to the input voltage node and a second terminal that is connected to a second bridge node, the second bridge node being connected to a second end of the primary winding, the first and second ends of the primary winding being opposing ends of the primary winding; a fourth switch comprising a first terminal that is connected to the second bridge node and a second terminal that is connected to the center tap of the secondary winding; a fifth switch comprising a first terminal that is connected to a first end of the secondary winding and a second terminal that is connected to a reference node of the converter circuit; and a sixth switch that forms a half-bridge current-doubler rectifier with the fifth switch and the secondary winding of the transformer, the sixth switch comprising a first terminal that is connected to a second end of the secondary winding and a second terminal that is connected to the reference node of the converter circuit, the first and second ends of the secondary winding being opposing ends of the secondary winding.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
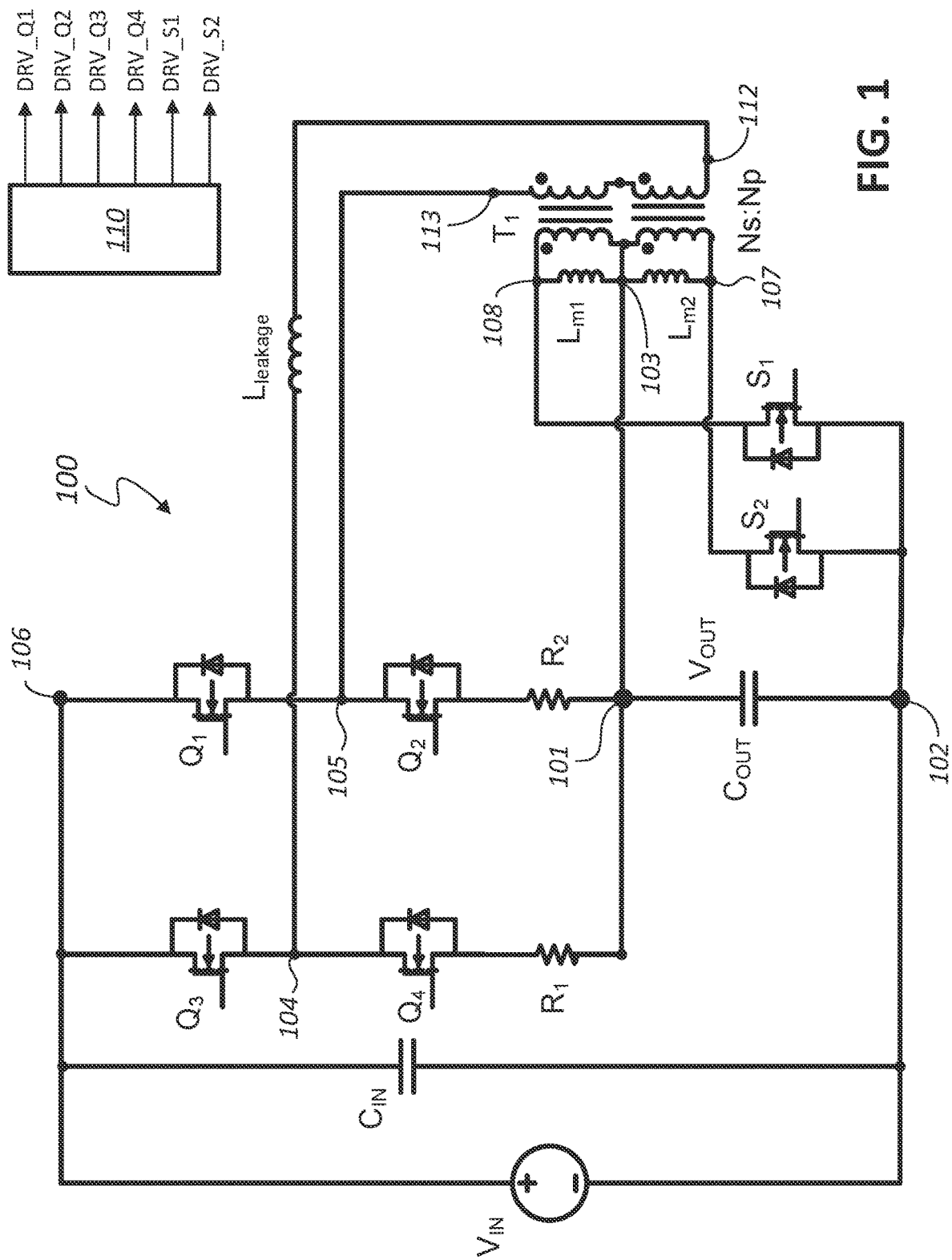
FIG. 1 is a schematic diagram of a converter circuit in accordance with an embodiment of the present invention.

FIG. 1 is a schematic diagram of a converter circuit 100 in accordance with an embodiment of the present invention. The converter circuit 100 receives an input voltage VIN at an input voltage node 106 and generates an output voltage VOUT at an output voltage node 101. The converter circuit 100 is configured as a non-resonant, non-isolated buck DC-DC converter in this example. As can be appreciated, the teachings of the present disclosure are equally applicable to other types of converters.

In the example of FIG. 1, the converter circuit 100 receives the input voltage VIN across the input voltage node 106 and a reference node 102, which serves as a ground reference. The converter circuit 100 generates the output voltage VOUT across an output voltage node 101 and the reference node 102. An input capacitor CIN is connected across the input voltage VIN, and an output capacitor COUT is connected across the output voltage VOUT. The converter circuit 100 may provide power to a load (not shown) that is connected to the output voltage VOUT.

In the example of FIG. 1, the converter circuit 100 comprises: a transformer T1 comprising a primary winding and a secondary winding; a half-bridge current-doubler rectifier comprising a switch S1, a switch S2, and the secondary winding; and a bridge circuit comprising switches Q1, Q2, Q3, and Q4. The bridge circuit has an input end that is connected to the input voltage node 106 and a reference end that is connected to the output voltage node 101. In one embodiment, the reference end is directly connected to a center tap 103 of the secondary winding of the transformer T1. Disposing the bridge circuit between the input voltage node 106 and the output voltage node 101 advantageously reduces the voltage stress across the bridge circuit, i.e., to VIN minus VOUT.

In one embodiment, the switches Q1, Q2, Q3, Q4, S1, and S2 each comprises a metal-oxide-semiconductor field-effect transistor (MOSFET). As can be appreciated, the switches Q1, Q2, Q3, Q4, S1, and S2 may also be implemented using other types of transistors or switches that are commonly employed in the semiconductor industry. Each of the switches Q1, Q2, Q3, Q4, S1, and S2 has a first terminal (e.g., drain terminal), a second terminal (e.g., source terminal), and a control terminal (e.g., gate terminal).

In the example of FIG. 1, the switch Q3 has a first terminal that is connected to the input voltage node 106 and a second terminal that is connected to a first bridge node 104; the switch Q1 has a first terminal that is connected to the input voltage node 106 and a second terminal that is connected to a second bridge node 105; the switch Q2 has a first terminal that is connected to the second bridge node 105 and a second terminal that is connected to the output voltage node 101 by way of a resistor R2; and the switch Q4 has a first terminal that is connected to the first bridge node 104 and a second terminal that is connected to the output voltage node 101 by way of a resistor R1.

The transformer T1 has the primary winding and the secondary winding. The turns ratio of the secondary winding relative to the primary winding is depicted in FIG. 1 as "Ns:Np". The turns ratio Ns:Np may be 1:1 or other ratio. The first bridge node 104 is connected to a first end 112 of the primary winding, and the second bridge node 105 is connected to a second end 113 of the primary winding, with the first end 112 and the second end 113 being opposite ends of the primary winding. In the example of FIG. 1, the inductance Leakage is the leakage inductance of the primary winding.

In the example of FIG. 1, second terminals of the switches S1 and S2 are connected to the reference node 102. A first end 107 of the secondary winding is connected to a first terminal of the switch S2, and a second end 108 of the secondary winding is connected to a first end of the switch S1, with the first end 107 and the second end 108 being opposing ends of the secondary winding. In one embodiment, the switch S1 is the only switch that is connected to the second end 108, and the switch S2 is the only switch that is connected to the first end 107.

The output voltage node 101 is connected to the center tap 103 of the secondary winding. In one embodiment, the center tap 103 is directly connected to the reference end of the bridge circuit. Shown in FIG. 1 are the magnetizing inductance Lm1 of a first portion of the secondary winding between the center tap 103 and the second end 108, and the magnetizing inductance Lm2 of a second portion of the secondary winding between the center tap 103 and the first end 107.

A controller 110 generates control signals DRV_Q1, DRV_Q2, DRV_Q3, DRV_Q4, DRV_S1, and DRV_S2 that drive corresponding control terminals of the switches Q1, Q2, Q3, Q4, S1, and S2, respectively. The controller 110 may generate the control signals to control the switching operation of corresponding switches to regulate the output voltage VOUT by pulse width modulation (PWM) or other conventional control algorithm.

Figure 2:
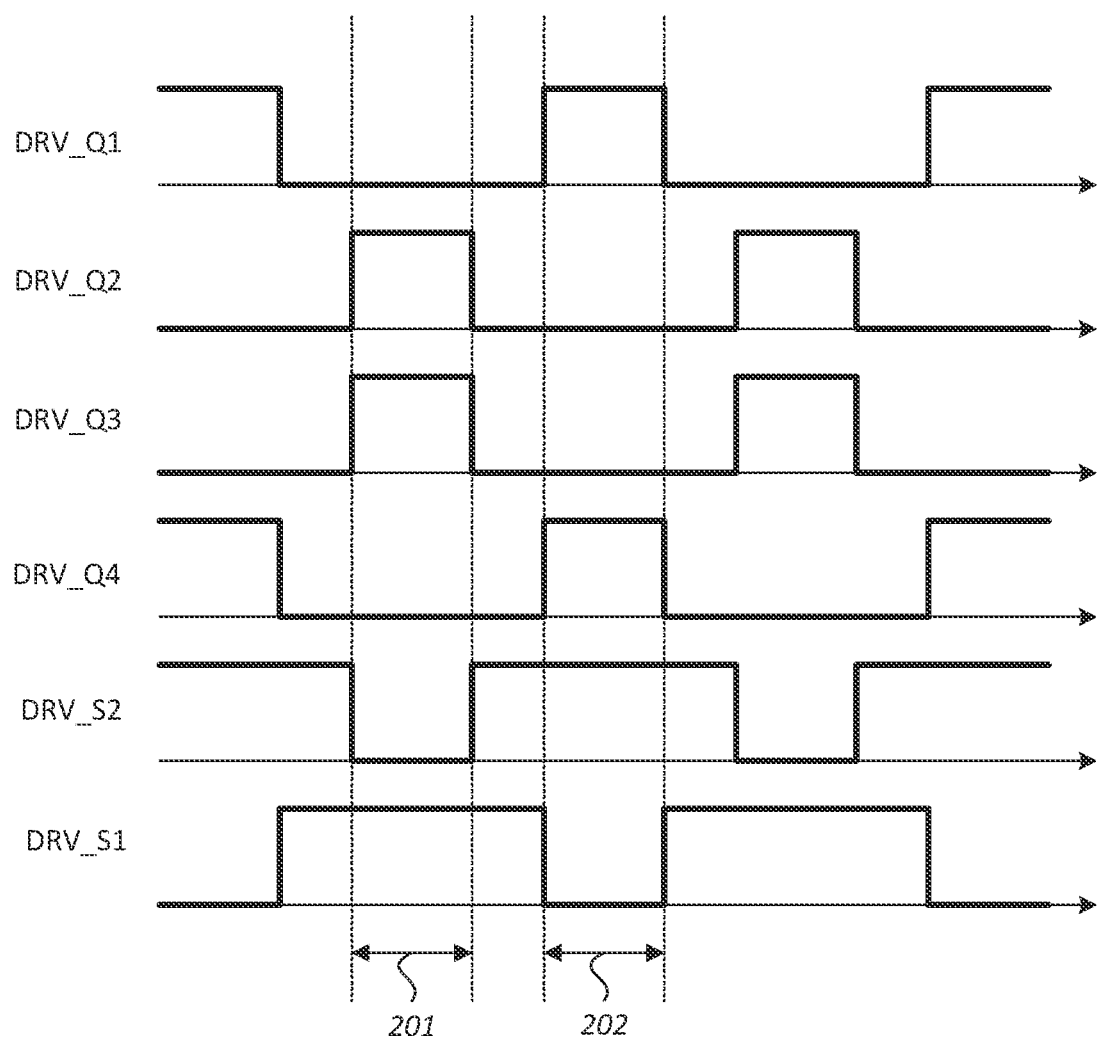
FIG. 2 is a timing diagram of control signals generated by a controller of the converter circuit of FIG. 1 in accordance with an embodiment of the present invention.

FIG. 2 is a timing diagram of the control signals generated by the controller 110 (shown in FIG. 1) in accordance with an embodiment of the present invention. In the example of FIG. 2, the horizontal axis is in units of time (increasing from left to right) and the vertical axis is in units of voltage (increasing from bottom to top). A control signal that is at logical HIGH indicates that the corresponding switch is turned ON; a logical LOW indicates that the corresponding switch is turned OFF. The operation of the converter circuit 100 of FIG. 1 is now explained with reference to the timing diagram of FIG. 2.

In one embodiment, the control signals DRV_Q1 and DRV_Q4 are in phase, and the control signal DRV_S1 is complementary to the control signals DRV_Q1 and DRV_Q4. That is, the switches Q1 and Q4 are turned ON or OFF at the same time, and the switch S1 has a logical state that is opposite to that of the switches Q1 and Q4. Put yet another way, the switch S1 is OFF when the switches Q1 and Q4 are both ON, and the switch S1 is ON when the switches Q1 and Q4 are both OFF.

In one embodiment, the control signals DRV_Q2 and DRV_Q3 are in phase, and the control signal DRV_S2 is complementary to the control signals DRV_Q2 and DRV_Q3. That is, the switches Q2 and Q3 are turned ON or OFF at the same time, and the switch S2 has a logical state that is opposite to that of the switches Q2 and Q3. Put yet another way, the switch S2 is OFF when the switches Q2 and Q3 are both ON, and the switch S2 is ON when the switches Q2 and Q3 are both OFF.

During a period 201, the switches Q2 and Q3 are both ON, the switches Q1 and Q4 are both OFF, the switch S2 is OFF, and the switch S1 is ON. Accordingly, on the primary side, the input current flows through the switch Q3, to the first end 112, through the primary winding, to the second end 113, through the switch Q2, and to the output voltage node 101. On the secondary side, the output current flows through the switch S1, to the second end 108, through the first portion of the secondary winding, to the center tap 103, and to the output voltage node 101.

During a period 202, the switches Q1 and Q4 are both ON, the switches Q2 and Q3 are both OFF, the switch S2 is ON, and the switch S1 is OFF. Accordingly, on the primary side, the input current flows through the switch Q1, to the second end 113, through the primary winding, to the first end 112, through the switch Q4, and to the output voltage node 101. On the secondary side, the output current flows through the switch S2, to the first end 107, through the second portion of the secondary winding, to the center tap 103, and to the output voltage node 101.

Figure 3:
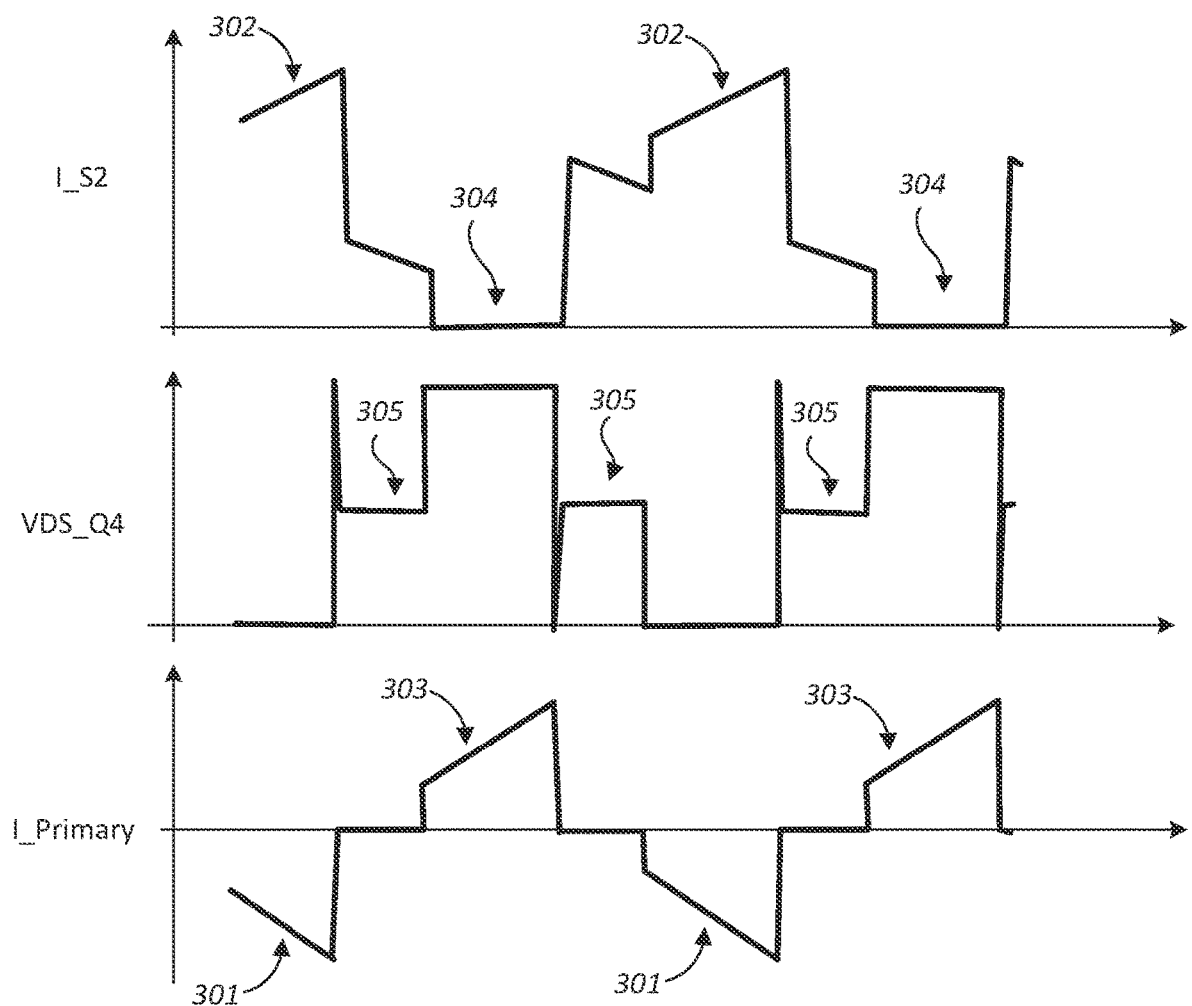
FIG. 3 is a timing diagram of signals of the converter circuit of FIG. 1 in accordance with an embodiment of the present invention.

FIG. 3 is a timing diagram of signals of the converter circuit 100 in accordance with an embodiment of the present invention. In the example of FIG. 3, from top to bottom, "I_S2" is the waveform of the current through the switch S2, "VDS_Q4" is the waveform of the drain-to-source voltage of the switch Q4, and "I_Primary" is the waveform of the current through the primary winding of the transformer T1. The current through the primary winding increases in the negative direction (see FIG. 3, 301) when the switches Q4 and Q1 are both ON. The switch S2 is ON and the switch S1 is OFF during that period (see FIG. 2, period 202), resulting in the increasing current through the switch S2 (see FIG. 3, 302).

Still referring to FIG. 3, the current through the primary winding increases in the positive direction (see FIG. 3, 303) when the switches Q2 and Q3 are both ON. The switch S1 is ON and the switch S2 is OFF during that period (see FIG. 2, period 201), resulting in the current through the switch S2 being zero (see FIG. 3, 304). The converter circuit 100 is configured for hard-switching, which results in some residual voltage across the drain and source of the switch Q4 between switching (see FIG. 3, 305).

The topology of the converter circuit 100 provides many advantages heretofore unrealized. First, the rectifier switches S1 and S2 form a half-bridge current-doubler rectifier with the secondary winding. More particularly, the average output current to the output voltage node 101 is approximately double the average current through each of the first and second portions of the secondary winding. As can be appreciated, unlike other current-doubler circuits, the half-bridge current-doubler rectifier of the converter circuit 100 does not have discrete inductors for current doubling. Instead, the current-doubler circuit of the converter circuit 100 employs the integrated magnetics of the transformer T1 (i.e., the secondary winding) for current doubling. Not necessarily having to use separate, discrete inductors to perform current doubling advantageously lowers manufacturing cost and increases PCB density.

Second, the converter circuit 100 allows the input current to be directly transferred to the output voltage through the primary winding. This direct input current transfer advantageously reduces the current through the secondary winding and the switches S1 and S2, thereby increasing the efficiency of the converter circuit 100.

Third, the primary side devices, namely switches Q1-Q4, have low voltage stress because the voltage across them is reduced by the output voltage VOUT, i.e., the voltage across the input end and the reference end of the bridge circuit is VIN minus VOUT. The low voltage stress reduces the cost of the switches Q1-Q4 and improves the reliability of the converter circuit 100.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A converter circuit comprising:
a bridge circuit that is connected between an input voltage node of the converter circuit and an output voltage node of the converter circuit, the bridge circuit having a first bridge node, a second bridge node, an input end that is connected to the input voltage node, and a reference end that is connected to the output voltage node;
a transformer comprising a primary winding and a secondary winding, the secondary winding having a first portion and a second portion, the primary winding having a first end that is connected to the first bridge node and a second end that is connected to the second bridge node, a tap between the first and the second portions of the secondary winding being connected to the reference end of the bridge circuit; and
a half-bridge current-doubler rectifier comprising the first portion of the secondary winding as a first inductor and the second portion of the secondary winding as a second inductor,
wherein the bridge circuit comprises a first switch, a second switch, a third switch, and a fourth switch;
wherein the first switch comprises a first terminal that is connected to the input voltage node and a second terminal that is connected to the second bridge node, the second switch comprises a first terminal that is connected to the second bridge node and a second terminal that is connected to the output voltage node, the third switch comprises a first terminal that is connected to the input voltage node and a second terminal that is connected to the first bridge node, the fourth switch comprises a first terminal that is connected to the first bridge node and a second terminal that is connected to the output voltage node, an output voltage of the converter circuit is between the second terminal of the second switch and a reference node of the converter circuit, and the output voltage is between the second terminal of the fourth switch and the reference node of the converter circuit.

2. The converter circuit of claim 1, wherein the second terminal of the fourth switch is connected to the output voltage node by way of a first resistor and the second terminal of the second switch is connected to the output voltage node by way of a second resistor.

3. The converter circuit of claim 1, wherein each of the first, second, third, and fourth switches is a MOSFET.

4. The converter circuit of claim 1, wherein the half-bridge current-doubler rectifier further comprises a fifth switch and a sixth switch; and
wherein the sixth switch comprises a first terminal that is connected to a first end of the secondary winding and a second terminal that is connected to the reference node of the converter circuit, the fifth switch comprises a first terminal that is connected to a second end of the secondary winding and a second terminal that is connected to the reference node of the converter circuit, and the tap is a center tap of the secondary winding.

5. The converter circuit of claim 4, further comprising:
an input capacitor that is connected across the input voltage node and the reference node of the converter circuit; and
an output capacitor that is connected across the output voltage node and the reference node of the converter circuit.

6. A converter circuit comprising:
an input voltage node, a reference node, and an output voltage node, an input voltage to the converter circuit being across the input voltage node and the reference node of the converter circuit, an output voltage generated by the converter circuit being across the output voltage node and the reference node of the converter circuit;

a transformer comprising a primary winding and a secondary winding, the secondary winding comprising a first portion and a second portion, a center tap of the secondary winding being between the first and second portions of the secondary winding;

a bridge circuit having an input end that is connected to the input voltage node, a reference end that is connected to the output voltage node, a first bridge node that is connected to a first end of the primary winding, and a second bridge node that is connected to a second end of the primary winding, the center tap of the secondary winding being connected to the reference end of the bridge circuit; and a half-bridge current-doubler rectifier comprising the secondary winding, a first switch comprising a first terminal that is connected to a first end of the secondary winding and a second terminal that is connected to the reference node of the converter circuit, and a second switch comprising a first terminal that is connected to a second end of the secondary winding and a second terminal that is connected to the reference node of the converter circuit, the first and second ends of the secondary winding being opposing ends of the secondary winding, wherein the bridge circuit comprises:

a third switch comprising a first terminal that is connected to the input voltage node and a second terminal that is connected to the second bridge node;

a fourth switch comprising a first terminal that is connected to the second bridge node and a second terminal that is connected to the output voltage node, the output voltage being between the second terminal of the fourth switch and the reference node of the converter circuit;

a fifth switch comprising a first terminal that is connected to the input voltage node and a second terminal that is connected to the first bridge node; and a sixth switch comprising a first terminal that is connected to the first bridge node and a second terminal that is connected to the output voltage node, the output voltage being between the second terminal of the sixth switch and the reference node of the converter circuit.

7. The converter circuit of claim 6, further comprising:

a first resistor; and a second resistor, wherein the first resistor connects the second terminal of the sixth switch to the output voltage node and the second resistor connects the second terminal of the fourth switch to the output voltage node.

8. The converter circuit of claim 6, further comprising:

an input capacitor that is connected across the input voltage; and an output capacitor that is connected across the output voltage.

9. A converter circuit comprising:

a transformer comprising a primary winding and a secondary winding, the secondary winding comprising a first portion and a second portion, a center tap of the secondary winding being between the first and second portions of the secondary winding, the center tap of the secondary winding being connected to an output voltage node of the converter circuit;

a first switch comprising a first terminal that is connected to an input voltage node of the converter circuit and a second terminal that is connected to a first bridge node, the first bridge node being connected to a first end of the primary winding;

a second switch comprising a first terminal that is connected to the first bridge node and a second terminal that is connected to the center tap of the secondary winding, an output voltage of the converter circuit being between the second terminal of the second switch and a reference node of the converter circuit;

a third switch comprising a first terminal that is connected to the input voltage node and a second terminal that is connected to a second bridge node, the second bridge node being connected to a second end of the primary winding;

a fourth switch comprising a first terminal that is connected to the second bridge node and a second terminal that is connected to the center tap of the secondary winding, the output voltage being between the second terminal of the fourth switch and the reference node of the converter circuit;

a fifth switch comprising a first terminal that is connected to a first end of the secondary winding and a second terminal that is connected to the reference node of the converter circuit; and a sixth switch that forms a half-bridge current-doubler rectifier with the fifth switch and the secondary winding of the transformer, the sixth switch comprising a first terminal that is connected to a second end of the secondary winding and a second terminal that is connected to the reference node of the converter circuit, the first and second ends of the secondary winding being opposing ends of the secondary winding.

10. The converter circuit of claim 9, further comprising:

a first resistor having a first end that is connected to the second terminal of the fourth switch and a second end that is connected to the output voltage node; and a second resistor having a first end that is connected to the second terminal of the second switch and a second end that is connected to the output voltage node.

11. The converter circuit of claim 9, further comprising:

an input capacitor across the input voltage node and the reference node of the converter circuit; and an output capacitor across the output voltage node and the reference node of the converter circuit.

\* \* \* \* \*